United States Patent [19]
Senn

[11] 4,137,828
[45] Feb. 6, 1979

[54] WELDING GUN

[76] Inventor: Charles Senn, 12633 Wilfred, Detroit, Mich. 48213

[21] Appl. No.: 825,255

[22] Filed: Aug. 17, 1977

[51] Int. Cl.² ............................................. F01B 15/02
[52] U.S. Cl. .............................. 92/117 R; 92/165 PR; 91/207
[58] Field of Search ........................ 91/207, 208, 209; 92/117 R, 107

[56] References Cited
U.S. PATENT DOCUMENTS

| 786,409 | 4/1905 | Coon | 91/207 |
| 2,505,771 | 5/1950 | Hoar et al. | 91/209 |
| 3,477,345 | 11/1969 | Johnson | 91/207 |

Primary Examiner—Paul E. Maslousky
Attorney, Agent, or Firm—Whittemore, Hulbert & Belknap

[57] ABSTRACT

A triple action welding gun for welding airport runway concrete reinforcing mesh or the like comprising an outer cylinder, an inner cylinder, a shaft and radially extending piston means operable between the inner and outer cylinders for providing a plurality of separate pressure chambers between the inner and outer cylinders, and means for passing into and exhausting from the pressure chambers a pressure medium to produce relative axial movement between the inner and outer cylinders wherein extension of the welding gun is accomplished at a particularly high pressure for cylinders of predetermined diameter to facilitate welding of large diameter reinforcing rods.

11 Claims, 3 Drawing Figures ated in FIG. 1, taken substantially on the line 2—2 in FIG. 1.

WELDING GUN

BACKGROUND OF THE INVENTION

1. Field of the Invention

The invention relates to welding guns and refers more particularly to a welding gun of relatively small diameter capable of exerting extremely high pressures due to a plurality of separate axially spaced apart and aligned pressure chambers therein, whereby particularly heavy reinforcing mesh such as airport runway concrete reinforcing mesh may be readily welded at relatively close intervals of spacing.

2. Description of the Prior Art

The welding gun of the invention is similar to welding guns such as that disclosed in U.S. Pat. Nos. 2,457,606 and 3,008,033. The welding gun of the invention is an improvement over the prior welding guns in that, for example, three separate axially aligned welding gun extension pressure chambers are provided in the welding gun of the present invention which increases the available pressure in the welding gun for a given diameter.

With the welding gun of the current design, it is thus possible to provide increased pressure necessary to weld large diameter reinforcing rods as for example used in airport runway construction. The welding of reinforcing mesh and the spacing required therein, necessitating relatively small diameter welding guns, is considered in U.S. Pat. Nos. 3,463,895 and 3,780,253.

SUMMARY OF THE INVENTION

In accordance with the present invention, a welding gun is provided including an outer cylinder having an end cap in one end thereof and including an axis of generation, a shaft having one end secured to the end cap of the outer cylinder on the center of the axis of generation of the outer cylinder and including a radially extending piston portion centrally thereof, and an annular, radially extending piston member secured to the other end thereof, an inner cylinder having a radially extending end portion at one end thereof, an end cap secured thereto at the other end thereof, and an annular piston member rigidly secured within the inner cylinder centrally thereof between the piston portion of the shaft and the piston member on the other end of the shaft whereby four separate, axially spaced apart and axially aligned pressure chambers are provided acting between the outer cylinder and inner cylinder on actuation of the welding gun.

The present welding gun further includes means for introducing a pressure transferring medium into three of the pressure chambers simultaneously or withdrawing the pressure medium from the three pressure chambers, and for introducing or withdrawing a pressure medium into or out of a fourth pressure chamber provided between the radially extending end portion of the inner cylinder and the piston portion of the shaft, whereby the inner cylindrical member may be reciprocated relative to the outer cylindrical member.

The welding gun of the present invention further includes means for securing the one end of the outer cylinder of the welding gun to structure for moving the entire welding gun axially along the axis of generation or holding the outer cylinder stationary, means for preventing relative rotation between the inner and outer cylinders, and means for securing welding electrodes and electrical conductors to the other end of the inner cylinder.

DESCRIPTION OF THE PREFERRED EMBODIMENT

Figure 1:
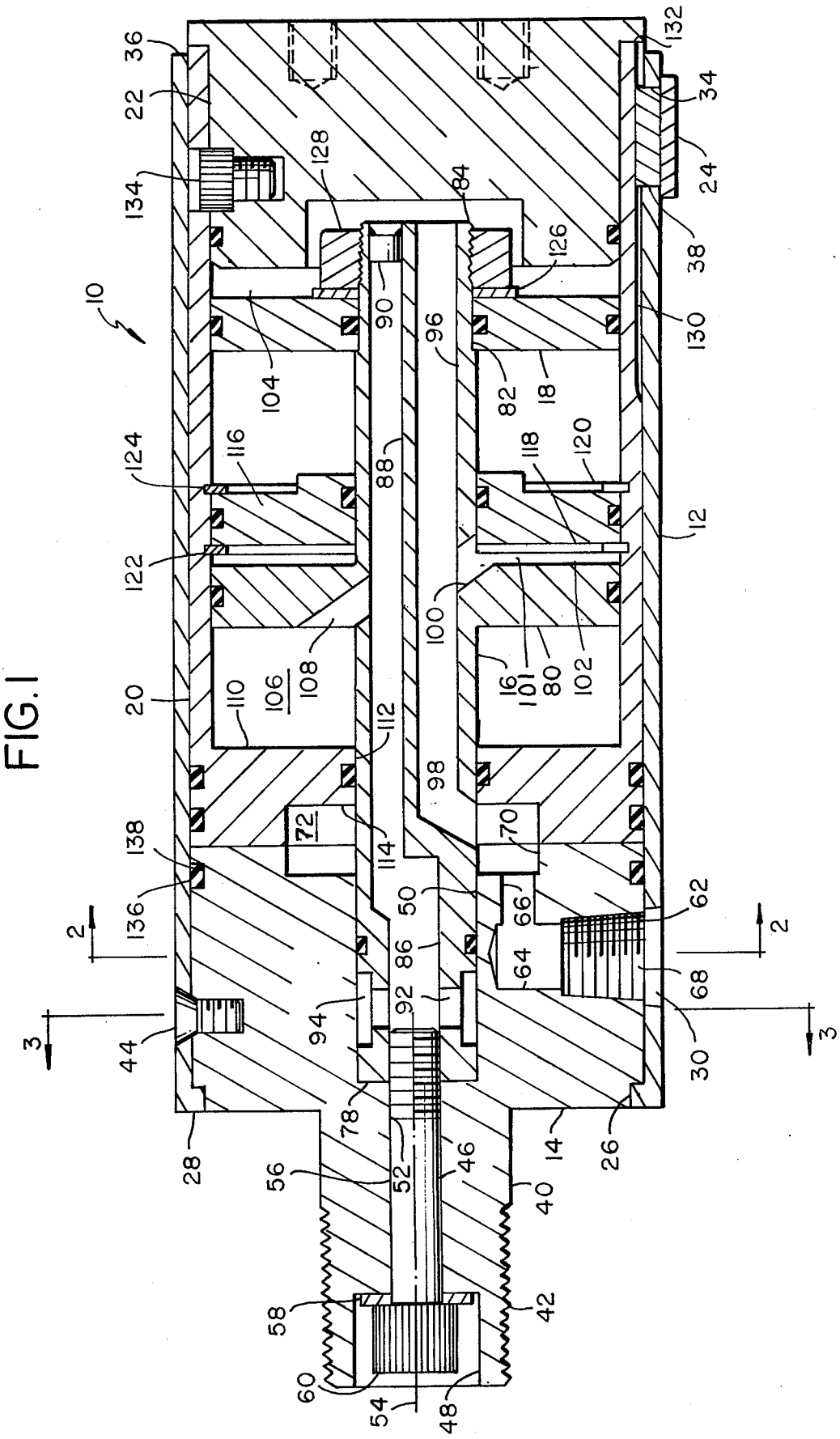
FIG. 1 is a longitudinal section view of a welding gun constructed in accordance with the invention, taken substantially on the line 1—1 in FIG. 2.

As shown best in FIG. 1, the welding gun 10 includes an outer cylinder 12 having an end cap 14 secured thereto, a shaft 16, one end of which is secured in the end cap 14, having a piston member 18 secured to the other end thereof, and an inner cylinder 20, having one end secured within the cylinder 12 and including an end cap 22 secured in the other end thereof. Slot and key means 24 are operable between the outer and inner cylinders 12 and 20 to prevent relative rotation therebetween while allowing relative axial movement.

More specifically, the outer cylinder 12 is provided with a short radially extending flange 26 at the one end 28 thereof which provides a seat for the end cap 14. Openings 30 and 32 extend through the outer cylinder 12 adjacent the one end 28 thereof through which a pressure transfer medium such as air or a hydraulic medium are passed into and out of the welding gun. An additional opening 34 extends radially through the other end 36 of the outer cylinder 12 for receiving the key 38 of the key and slot means 24, as will be considered subsequently.

The end cap 14 is cylindrical and as shown has a reduced diameter end 40 including a threaded portion 42 thereon by which the welding gun 10 may be secured to an appropriate fixture in position to perform a weld on reciprocation of the inner cylinder 20 with respect to the outer cylinder 12. The outer cylinder 12 is secured to the end cap 14 by convenient means such as screws 44. A passage 46 having the larger diameter portions 48 and 50, with the smaller diameter portion 52 therebetween, extends through the end cap 14 on the axis of generation 54 of the outer cylinder 12. As shown, the central portion 52 of the passage 46 receives the body of the bolt 56 which secures the shaft 16 to the end cap 14 therein, while the one end portion 48 of the passage 46 receives the washer 58 and head 60 of the bolt 56, and the portion 50 of the passage 46 receives the end 78 of shaft 16 secured therein by the bolt 56.

Figure 2:
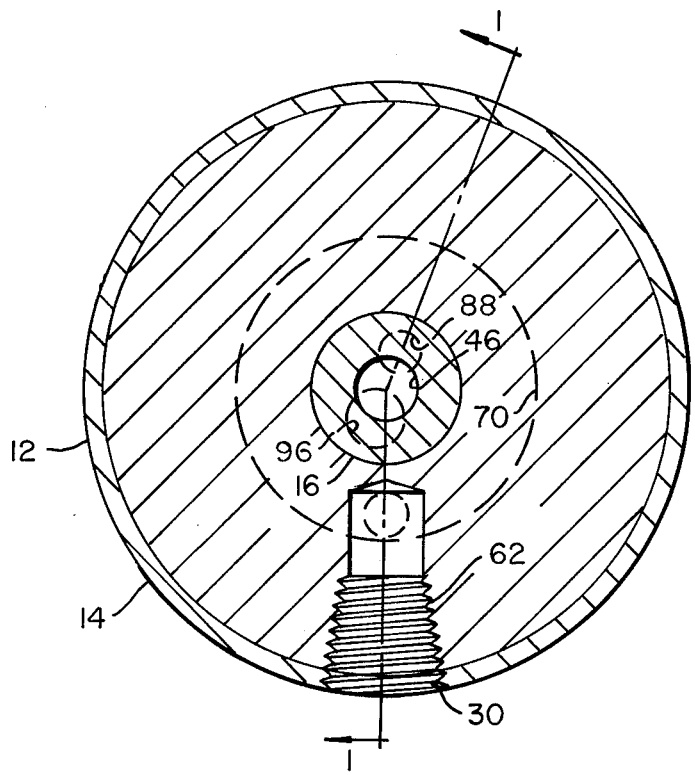
FIG. 2 is a cross section of the welding gun, illustrated in FIG. 1, taken substantially on the line 2—2 in FIG. 1.

A first passage 62 having a radially extending portion 64 and an axially extending portion 66 extends through the end cap 14, as shown best in FIGS. 1 and 2. One end 68 of the radially extending portion of the passage 62 is threaded and is aligned with the opening 30 in the outer cylinder 12, whereby a pressure medium conduit may be connected to the end cap 14 to pass pressure transfer medium through the passage 62. A further radially enlarged portion 70 is provided in the passage 46 through the end cap 14 to provide an initial portion of a first welding gun extension pressure chamber 72 between the inner and outer cylinders 12 and 20 with the inner cylinder 20 completely retracted, as shown in FIG. 1.

Figure 3:
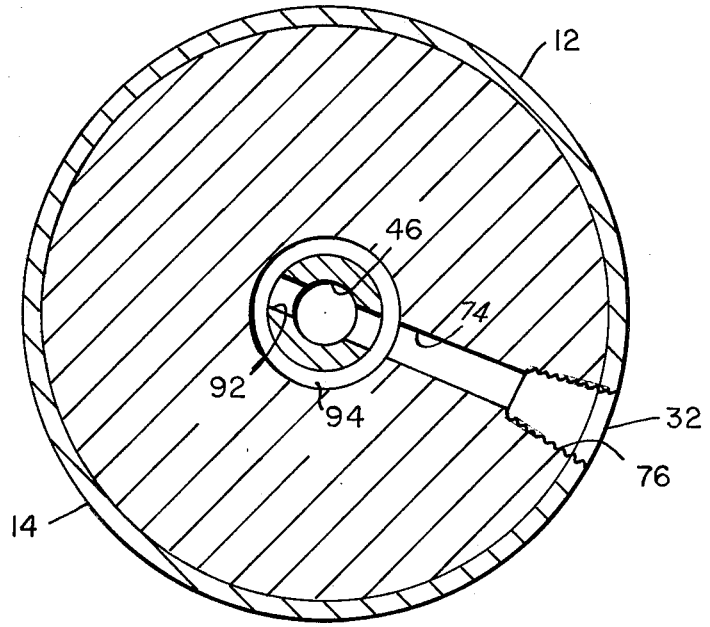
FIG. 3 is a cross section of the welding gun, illustrated in FIG. 1, taken substantially on the line 3—3 in FIG. 1.

A second radially extending passage 74 having a threaded outer end portion 76 aligned with the opening 32 through the outer cylinder 12 extends through the end cap 14 as shown best in FIG. 3. Pressure transfer medium is also passed through the passage 74 from a pressure conduit not shown.

The shaft 16, as shown, has an end 78 extending into the portion 50 of the passage 46 in the end cap 14 and is held in position in the passage 46 by means of the bolt 56. The shaft 16 includes a centrally positioned, radially extending piston portion 80 thereon extending from the outer diameter of the shaft to the inner diameter of the inner cylinder.

In addition, the shaft 16 has a reduced diameter end portion 82 for receiving the annular piston member 18 and has a threaded other end 84.

A first passage 86 extends centrally of the one end 78 of the shaft 16 on the center of generation of the outer cylinder 12. A second passage 88 extends through the other end 84 of the shaft 16, and as shown best in FIG. 1, the second passage 88 is in communication with the first passage 86. An end plug 90 is provided in the passage 88.

A radially extending passage 92 is provided adjacent the end 78 of the shaft 16 and is in communication with the passage 86 centrally thereof. The opposite ends of the passage 92 are also in communication with an axially enlarged annular groove 94 adjacent the end 78 of the shaft 16. The annular groove 94 is also in communication with the radially inner end of the passage 74 through the end cap 14.

The passage 88 is in communication with the return pressure chamber 106 through the radially extending passage 108, as shown.

A further axial passage 96 is provided in the shaft 16 from the end 84 thereof, which passage 96 terminates in a radially extending portion 98 in communication with the chamber 72, as shown best in FIG. 1. A radially extending passage 100 is in communication with the pressure 96 so that the passage 96 is in communication with the second welding gun extension pressure chamber 101. The passage 96 is also in communication with the third welding gun extension pressure chamber 104 through the end 84 of the shaft 16.

Inner cylinder 20 has a radially extending end portion 110 including the opening 112 for the shaft 16 therein. The opening 112 includes an enlarged diameter portion 114, which together with the portion 70 of the passage 46, provides the initial welding gun extension pressure chamber 72 with the cylinder 20 retracted, as shown in FIG. 1.

The annular member 116 is secured within the inner cylinder 20 centrally thereof, as shown, by means of the retaining rings 118 and 120 on opposite sides thereof extendig within the grooves 122 and 124 in the inner cylinder 20.

As previously indicated, the annular piston member 18 is secured over the reduced diameter portion 82 of shaft 16 by means of washer 126 and nut 128.

Slot 130 is provided in the outer surface of the cylinder 20, as shown best in FIG. 1, and cooperates with the key 38 to prevent relative rotation between the outer cylinder 12 and the inner cylinder 20.

End plate 22, having a cross section as shown best in FIG. 1, is secured over the end 132 of the inner cylinder 20 by convenient means such as bolts 134.

Annular sealing rings 136 are provided in annular grooves in the welding gun as shown.

In operation of the welding gun 10, the gun is first secured in a fixed position or on a ram or the like by means of the threads 42 on the end cap 14. A pressure transfer medium such as air or hydraulic fluid is connected through the opening 30 in the outer cylinder 12 into the passage 62. A pressure transfer medium is also connected through the opening 32 into the passage 74. The pressure transfer medium may be passed to the welding gun 10 through suitable hoses and connectors, not part of the invention and therefore not illustrated.

A welding electrode is connected to the end cap 22, again by convenient means such as bolts not shown. The electrode may be connected to the required electrical source as necessary. Again, the welding electrode and/or the source of electrical energy are not part of the present invention and are therefore not illustrated.

With the welding gun 10 so connected, the pressure transfer medium is passed into the passage 96 by known valve means, not shown. The actuating pressure may, for example, be 80 pounds per square inch and will be felt in the welding gun extension pressure chambers 72, 102 and 104 at the same time. The actuating pressure will cause the inner cylinder 20 to move to the right in FIG. 1, out of the end 36 of the outer cylinder 12 to move an electrode connected to the end plate 22 toward a workpiece to be welded.

After the initial movement, the outer diameter of the chamber 72 will be the inner diameter of the outer cylinder 12. The outer diameter of the chamber 102 and the outer diameter of the chamber 104 will be the inner diameter of the inner cylinder 20. The inner diameter of the chambers 70 and 102 will be the outer diameter of the shaft 16. The chamber 104 will have no inner diameter.

Thus, with a four inch outer diameter of outer cylinder 12, the areas of chambers 70, 102 and 104 in a preferred embodiment may be 10.26 sq. in., 8.16 sq. in. and 8.94 sq. in., respectively. The total pressure area for a welding gun extension stroke will thus be 27.26 sq. in., whereby with an 80-pound line pressure a weld could be performed at 2181 pounds pressure. With a 100-pound line pressure a weld could be performed with 2726 pounds pressure.

Such pressures are not presently available in welding guns having such small diameter and are essential in welding thick metal such as large diameter reinforcing rods as used to provide airport runway concrete reinforcing mesh wherein the individual reinforcing rods may, for example, have a diameter of one inch. The stroke of the welding gun may for example be one inch.

After a weld is completed, the pressure medium is exhausted from the welding gun extension pressure chambers 70, 102 and 104 and pressure medium is applied through the passage 74 into the welding gun retraction pressure chamber 106 which may, for example, have an area of 8.16 sq. in. to provide a return stroke for the welding gun 10. It will be readily understood that the pressure required for the return stroke is not as great as that required for the actuating stroke since no welding is performed with the inner cylinder 20 retracted as shown in FIG. 1.

While one embodiment of the triple acting welding gun of the invention has been disclosed in detail, it will be understood that other modifications and embodiments are contemplated. It is the intention to include all embodiments and modifications of the invention as are defined by the appended claims within the scope of the invention.

What I claim as my invention is:

1. A welding gun for welding airport concrete mesh or the like comprising an outer cylinder having an axis of generation, an end cap secured in one end of the outer cylinder, a shaft, means for securing the shaft to the center of the end cap within the outer cylinder at one end thereof with the shaft extending along the axis of generation of the outer cylinder, an inner cylinder having a radially extending piston portion at one end thereof with an axially extending hole therethrough for receiving the shaft which is positioned within the outer cylinder over the shaft for reciprocal movement relative to the outer cylinder along the axis of generation thereof, whereby a first welding gun extension pressure chamber is formed between the radially extending piston portion of the inner cylinder and the end cap in the one end of the outer cylinder in conjunction with the outer cylinder, a piston secured to the shaft centrally thereof on the side of the piston portion of the inner cylinder opposite the end cap in the outer cylinder and extending radially from the shaft to the inner wall of the inner cylinder forming a welding gun retraction pressure chamber between the adjacent surface of the radially extending piston portion of the inner cylinder and one surface of the piston secured to the shaft, a radially extending annular piston secured to the inner cylinder substantially centrally thereof through which the shaft extends, whereby a second welding gun extension pressure chamber is formed between the other surface of the piston member secured to the shaft and one surface of the piston secured to the inner cylinder in conjunction with the shaft and the inner cylinder, an annular piston secured to the other end of the shaft on the side of the annular piston secured to the inner cylinder opposite the piston secured to the shaft centrally thereof, an end cap positioned in the other end of the inner cylinder on the side of the piston secured to the other end of the shaft opposite the piston secured to the inner cylinder, whereby a third welding gun extension pressure chamber is formed between the annular piston secured to the other end of the shaft and the end cap in the other end of the inner cylinder in conjunction with the shaft and the inner cylinder, means for passing a pressure transfer medium into and out of the welding gun extension pressure chambers simultaneously and means for passing a pressure transfer medium into and out of the welding gun retraction pressure chamber.

2. Structure as set forth in claim 1 wherein the means for passing a pressure transfer medium into the welding gun extension pressure chambers includes a passage extending radially through the one end of the outer cylinder and associated end cap and axially and radially through the shaft having an outlet into each of the welding gun extension pressure chambers.

3. Structure as set forth in claim 1 wherein the means for passing a pressure transfer medium into and out of the welding gun retraction pressure chamber includes a passage extending axially of the shaft and radially through the one end of the shaft and the end cap in the one end of the outer cylinder and having an outlet into the welding gun retraction pressure chamber.

4. Structure as set forth in claim 1, and further including a threaded shank integral with the end cap in the one end of the outer cylinder having a dual diameter bore extending axially therethrough with the larger diameter opening toward the other end of the outer cylinder, the one end of the shaft extending into the larger diameter portion of the dual diameter bore, and a bolt extending through the smaller diameter end of the dual diameter bore and threadedly engaging the one end of the shaft to secure the shaft in the end cap in the outer cylinder.

5. Structure as set forth in claim 1, and further including an axially extending slot in the other end of the outer cylinder, an axially extending elongated groove in the other end of the inner cylinder aligned with the slot, and key means secured to the outer cylinder passing through the slot therein and extending into the groove in the inner cylinder for preventing relative rotation of the inner cylinder within the outer cylinder.

6. Structure as set forth in claim 1, wherein the means for securing the piston to the inner cylinder comprises a pair of annular spaced apart grooves on the inner surface of the inner cylinder, and snap rings positioned partly within the grooves and extending partly into the inner cylinder on either side of the piston secured to the inner cylinder.

7. Structure as set forth in claim 1, wherein the means for securing the piston to the other end of the shaft comprises a reduced diameter partly threaded other end portion on the shaft forming an abutment thereon and nut and washer structure threadedly engaged with the other end of the shaft for clamping the piston to the other end of the shaft between the abutment formed by the reduced diameter end thereof and the nut and washer structure.

8. A welding gun for welding airport concrete mesh or the like comprising an outer cylinder having an axis of generation, an end cap secured within one end of the outer cylinder, said end cap having a dual diameter axially extending bore therein with the larger diameter opening toward the other end of the outer cylinder and a shank portion extending out of the one end of the outer cylinder on the axis thereof including a theaded end thereon, a shaft extending axially of the outer cylinder one end of which extends into the larger diameter end of the dual diameter axially extending bore through the end cap in the outer cylinder, a bolt extending through the smaller diameter portion of the dual diameter axially extending bore through the end cap in the outer cylinder threadedly engaging the one end of the shaft to secure the one end of the shaft in the bore in the end cap in the one end of the outer cylinder, a radially extending piston portion constructed integrally with said shaft substantially centrally thereof, said shaft having a reduced diameter other end portion forming an abutment and a threaded outer end, an inner cylinder positioned within the outer cylinder for reciprocal axial movement relative thereto having an integral radially extending annular inner end piston portion extending radially between the inner surface of the outer cylinder and the outer surface of the shaft, said integral piston portion being positioned between the end cap in the one end of the outer cylinder and the integral piston portion on the shaft and forming a first welding gun extension pressure chamber between the end cap in the outer cylinder and the integral piston portion on the inner cylinder in conjunction with the shaft and outer cylinder, said integral piston portion of said inner cylinder and the integral piston portion of said shaft forming a welding gun retraction pressure chamber therebetween in conjunction with the shaft and inner cylinder, an annular piston member sleeved over said shaft and secured to the inner surface of the inner cylinder on the side of the integral piston portion of the shaft opposite the integral piston portion of the inner cylinder by means including annular grooves in the inner surface of the inner cylinder and snap rings positioned therein extending radially into the inner cylinder on each side of the annular piston member sleeved over the shaft, said annular piston member and integral piston portion of the shaft forming a second welding gun extension pressure chamber therebetween in conjunction with the shaft and inner cylinder, an annular piston member sleeved over the reduced diameter other end of the shaft and extending radially to the inner surface of the inner cylinder, nut means secured to the threaded other end of the shaft for securing the annular piston member sleeved over the other end of the shaft between the nut and abutment formed by the reduced diameter end of the shaft, an end cap secured in the other end of the inner cylinder axially outwardly of the other end of the shaft whereby a third welding gun extension pressure chamber is formed between the piston member secured to the other end of the shaft and the end cap in the other end of the inner cylinder in conjunction with the shaft and inner cylinder, means for passing a pressure transfer medium into and out of the welding gun extension pressure chambers and means for passing a pressure transfer medium into and out of the welding gun retraction pressure chamber.

9. Structure as set forth in claim 8, wherein the means for passing a pressure transfer medium into and out of the welding gun extension pressure chambers comprises a transverse opening adjacent the one end of the outer cylinder, a radially extending bore in the end cap in the one end of the outer cylinder aligned with the opening adjacent the inner end of the outer cylinder, an axially extending passage in the end cap in the outer cylinder providing communication between the radially extending passage in the end cap and the first welding gun extension pressure chamber, a radially and axially extending first passage in the shaft extending from the first welding gun extension pressure chamber to the other end of the shaft, and a passage in communication with the first passage in the shaft and the second welding gun extension pressure chamber.

10. Structure as set forth in claim 8, wherein the means for passing a pressure transfer medium into and out of the welding gun retraction pressure chamber includes a transverse opening adjacent the one end of the outer cylinder, a radially extending passage in the end cap in the outer cylinder between the opening adjacent the one end of the outer cylinder and the dual diameter bore in the end cap, an annular groove in the one end of the shaft in communication with the radially extending passage in the end cap in the outer cylinder, a radially extending bore extending through the one end of the shaft in communication with the annular groove therein, and an axially and radially extending passage in the shaft in communication with the radially extending bore through the one end of the shaft and the welding gun retraction pressure chamber.

11. A welding gun for welding airport concrete mesh or the like comprising an outer cylinder having an axis of generation, an end cap secured within one end of the outer cylinder, said end cap having a dual diameter axially extending bore therein with the larger diameter opening toward the other end of the outer cylinder and a shank portion extending out of the one end of the outer cylinder on the axis thereof including a threaded end thereon, a shaft extending axially of the outer cylinder one end of which extends into the larger diameter end of the dual diameter axially extending bore through the end cap in the outer cylinder, a bolt extending through the smaller diameter portion of the dual diameter axially extending bore through the end cap in the outer cylinder threadedly engaging the one end of the shaft to secure the one end of the shaft in the bore in the end cap in the one end of the outer cylinder, a radially extending piston portion constructed integrally with said shaft substantially centrally thereof, said shaft having a reduced diameter other end portion forming an abutment and a threaded outer end, an inner cylinder positioned within the outer cylinder for reciprocal axial movement relative thereto having an integral radially extending annular inner end piston portion extending radially between the inner surface of the outer cylinder and the outer surface of the shaft, said integral piston portion being positioned between the end cap in the one end of the outer cylinder and the integral piston portion on the shaft and forming a first welding gun extension pressure chamber between the end cap in the outer cylinder and the integral piston portion on the inner cylinder in conjunction with the shaft and outer cylinder, said integral piston portion of said inner cylinder and the integral piston portion of said shaft forming a welding gun retraction pressure chamber therebetween in conjunction with the shaft and inner cylinder, an annular piston member sleeved over said shaft and secured to the inner surface of the inner cylinder on the side of the integral piston portion of the shaft opposite the integral piston portion of the inner cylinder by means including annular grooves in the inner surface of the inner cylinder and snap rings positioned therein extending radially into the inner cylinder on each side of the annular piston member sleeved over the shaft, said annular piston member and integral piston portion of the shaft forming a second welding gun extension pressure chamber therebetween in conjunction with the shaft and inner cylinder, an annular piston member sleeved over the reduced diameter other end of the shaft and extending radially to the inner surface of the inner cylinder, nut means secured to the threaded other end of the shaft for securing the annular piston member sleeved over the other end of the shaft between the nut and abutment formed by the reduced diameter end of the shaft, an end cap secured in the other end of the inner cylinder axially outwardly of the other end of the shaft whereby a third welding gun extension pressure chamber is formed between the piston member secured to the other end of the shaft and the end cap in the other end of the inner cylinder in conjunction with the shaft and inner cylinder, means for passing a pressure transfer medium into and out of the welding gun extension pressure chambers comprising a first transverse opening adjacent the one end of the outer cylinder, a first radially extending bore in the end cap in the one end of the outer cylinder aligned with the opening adjacent the inner end of the outer cylinder, a first axially extending passage in the end cap in the outer cylinder providing communication between the first radially extending passage in the end cap and the first welding gun extension pressure chamber, a first radially and axially extending passage in the shaft extending from the first actuating pressure chamber to the other end of the shaft, and a passage in communication with the first passage in the shaft and the second welding gun extension pressure chamber and means for passing a pressure transfer medium into and out of the welding gun retraction pressure chamber operably associated with the inner and outer cylinders including a second transverse opening adjacent the one end of the outer cylinder, a second radially extending passage in the end cap in the outer cylinder between the second opening adjacent the one end of the outer cylinder and the dual diameter bore in the end cap, an annular groove in the one end of the shaft in communication with the second radially extending passage in the end cap in the outer cylinder, a radially extending bore extending through the one end of the shaft in communication with the annular groove therein, and a second axially and radially extending passage in the shaft in communication with the radially extending bore through the one end of the shaft and the welding gun retraction pressure chamber.

* * * * *